Figure 1:
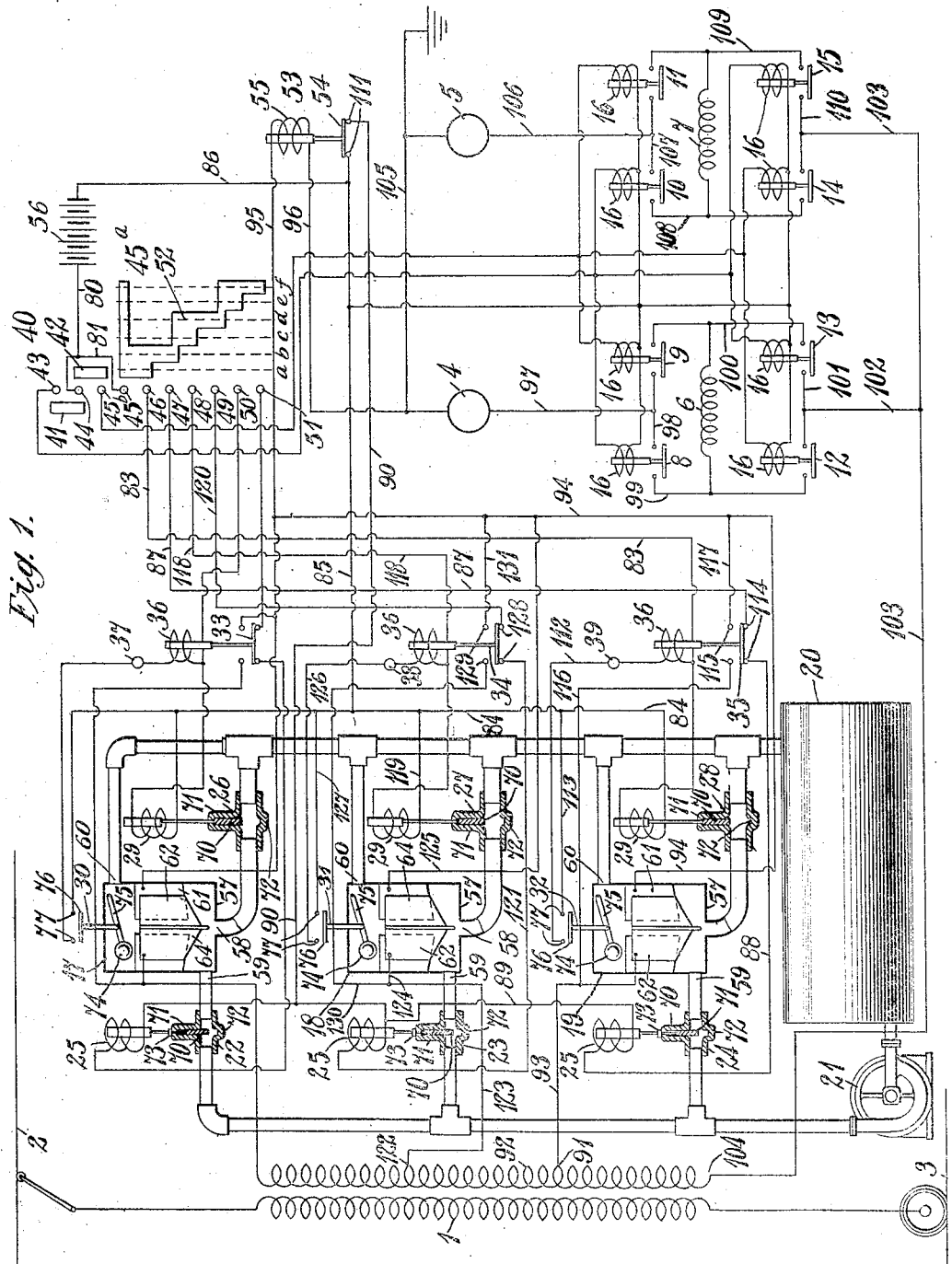

N. W. STORER.
SYSTEM OF CONTROL.
APPLICATION FILED JUNE 6, 1911.

1,056,852.

Patented Mar. 25, 1913.
2 SHEETS—SHEET 2.

WITNESSES:
Fred H. Miller
D. H. Mace

INVENTOR
Norman W. Storer
BY
Wiley G. Carr
ATTORNEY

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,056,852.

Specification of Letters Patent.   Patented Mar. 25, 1913.

Application filed June 6, 1911. Serial No. 631,585.   REISSUED

*To all whom it may concern:*

Be it known that I, NORMAN W. STORER, a citizen of the United States, and a resident of Pittsburgh, in the county of Allegheny and State of Pennsylvania, have invented a new and useful Improvement in Systems of Control, of which the following is a specification.

My invention relates to systems of control for electric motors and it has special reference to such systems as are adapted to control single-phase railway motors by means of so-called "liquid rheostats."

The object of my invention is to provide a system of the above-indicated class which shall be simple in arrangement, effective in operation, light, durable and inexpensive in construction, and particularly adapted to eliminate the usual multiplicity of unit switches or contactors by the employment of a relatively small number of liquid rheostats.

Another object of my invention is to provide simple and adequate means for controlling the operation of liquid rheostats by means of a continuous circulation of an electrolyte, whereby a considerable increase in heat radiation is effected which results in a greater uniformity of operation and materially reduces the sizes and weights of parts.

A still further object of my invention is to provide a liquid rheostat which shall be so constructed as to embody means for reducing the current to a minimum just prior to opening the circuit in order that the arc formed at the instant of interruption shall not be so violent as to be detrimental to the smooth operation of the system or injurious to the apparatus.

In the prior art, where electric locomotives have been employed in single-phase railway systems, the control of the driving motors has been accomplished by means of a plurality of unit switches and an intricate system of wiring, whereby the voltage applied to the motors has been varied in steps. In order not to open the circuit between steps, it has also been necessary to use either resistances or preventive coils. Furthermore, when liquid rheostats have heretofore been employed in connection with three-phase locomotives, their operation has usually been effected by gradually raising or lowering the height of the body of electrolyte in the electrode tanks by means of compressed air or similar means which elevated the electrolyte from its reservoir into contact with the electrode plates. By reason of the heavy currents frequently handled for comparatively long periods of time, the body of electrolyte was necessarily large, and elaborate provisions for cooling and heat radiation were required, thereby involving unnecessary weight and expense.

According to my present invention, I propose to overcome many of the objections and difficulties in the prior art and to combine the advantages of a minimum number of switching devices and gradual speed regulation without the interruption of the motor current, with the advantages of liquid rheostats having a continuous circulation of an electrolyte and with those of simple, light and inexpensive control apparatus.

It is my purpose to employ comparatively few liquid rheostats, each of which is to be connected to a tap on the usual transformer winding, by means of which the voltage and speed of the motors may be increased from the lowest to the highest without opening the motor circuits.

It will, of course, be understood that there will be only as many economical "running positions" as there are rheostats which may be short-circuited when filled with electrolyte. Between the several "running positions," the increase of voltage on the motors is determined by the gradual rise in the level of the electrolyte and, in order that the rate of increase may be retarded, if desired, I provide means for reducing the normal maximum rate of flow of the electrolyte. Thus, it is evident that I provide a control system which embodies the operating features of a "voltage control" system with those of a system of "rheostatic control." Moreover, the electrolyte is continuously circulated by means of a suitable pump so that it is uniformly heated and a free and liberal dissipation of heat is facilitated.

I shall illustrate a typical embodiment of my invention in connection with the control of single-phase motors, but it should be understood that I do not confine myself in this respect, as it is obvious that my invention may be employed in the control of various other types of motors by merely making such simple modifications in the structural details and in the arrangement of circuits and parts as may lie within the province of those skilled in the art.

Figure 2:
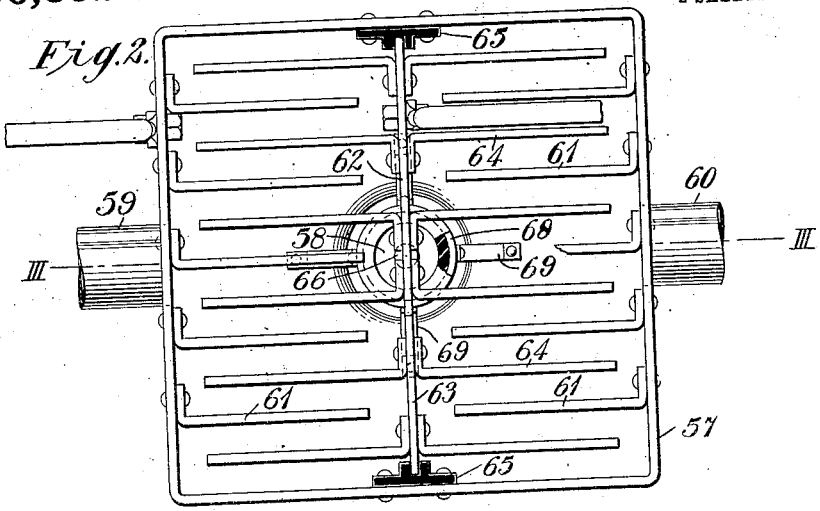
Figure 3:
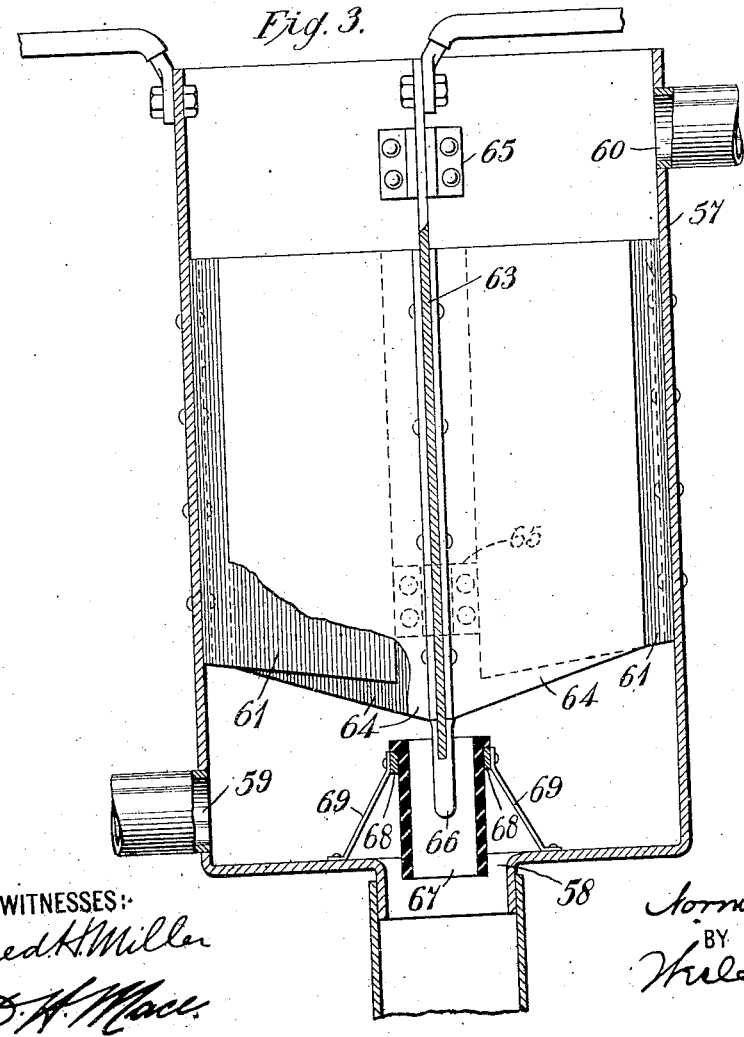

In the accompanying drawings, Figure 1 is a diagrammatic view of a system of control, embodying my invention, Fig. 2 is a plan view of a liquid rheostat constructed in accordance with my invention, and Fig. 3 is a view, partially in elevation and partially in vertical section of the device shown in Fig. 2.

Referring to the drawings in detail, the system shown comprises a transformer 1 that is adapted to receive energy from any suitable circuit, such as a trolley conductor 2 and a track 3 of a railway system; a plurality of motors of the commutator type having armatures 4 and 5 and field magnet windings 6 and 7, respectively; a plurality of switches 8 to 15, inclusive, for adjusting the connections of said field magnet windings whereby the direction of rotation of the motors is controlled; a plurality of operating magnet windings 16 for respectively actuating said switches, a plurality of liquid rheostats 17, 18 and 19 for adjusting the connections of the motors with suitable taps in the secondary winding of the transformer 1; a reservoir 20 to contain a body of electrolyte; a pump or other suitable apparatus 21 and the necessary piping and fittings whereby said electrolyte may be continuously circulated through the liquid rheostats 17, 18 and 19; a plurality of valves 22, 23 and 24 for controlling the admission of electrolyte to the several liquid rheostats; a plurality of operating magnet windings 25 for respectively controlling the operation of the admission valves 22, 23 and 24; a plurality of valves 26, 27 and 28 for controlling the discharge of electrolyte from the several liquid rheostats 17, 18 and 19; a plurality of actuating magnet windings 29 for respectively controlling the action of the valves 26, 27 and 28; a plurality of float valve switching devices 30, 31 and 32 which are adapted to be actuated by the electrolyte when the liquid rheostats are filled; a plurality of switches 33, 34 and 35 for respectively short-circuiting the liquid rheostats 17, 18 and 19 when filled; a plurality of actuating magnet windings 36 for respectively controlling the operation of the short-circuiting switches 33, 34 and 35 and which depend, for their energization, upon the operation of the float valve switching devices 30, 31 and 32; a plurality of signal lamps 37, 38 and 39 for respectively indicating the closure of the short-circuiting switches 33, 34 and 35; a reversing switch 40 for controlling the operation of the magnet windings 16 of the switches 8 to 15, inclusive, said reversing switch 40 comprising movable contact segments 41 and 42 and coöperating contact terminals 43, 44 and 45; a master controller 45$^a$ for governing the circuit connections of the control magnet windings 25, 29 and 36, said master controller comprising stationary contact terminals 45$^b$ to 51, inclusive, and a movable conducting segment 52 that, for motor operation, is adapted to coöperate with said stationary contact terminals 45$^b$ to 51, inclusive, upon the position-indicating lines $a$, $b$, $c$, $d$, $e$ and $f$; a series relay 53 comprising a switch member 54 and an actuating magnet winding 55 and connected in series with the main motor circuit and adapted to automatically control the operation of the admission valves 22, 23 and 24; and a battery or other suitable source of energy 56 for supplying energy to the control magnet windings 16, 25, 29 and 36.

The liquid rheostats 17, 18 and 19 are of like construction and each comprises a containing tank 57 having a centrally disposed bottom discharge opening 58, an inlet port 59 located near the bottom and an overflow port 60 disposed in the upper portion thereof. A plurality of vertically disposed contact plates 61 are suitably secured to opposite sides of the tank 57 and project inwardly toward each other. An electrode 62 is located intermediate the contact plates 61 and comprises a supporting plate 63 and a plurality of vertically disposed contact plates 64 secured thereto and projecting outwardly on opposite sides into the spaces between the contact plates 61.

The electrode 62 is secured in position and insulated from the tank 57 by means of suitable insulating supports 65 and the lower portions of each of the plates 64 are inwardly and downwardly inclined, as shown in Fig. 3. A projecting portion or rod 66 of conducting material is secured to the supporting member 63 of the electrode 62 and is centrally located above the discharge opening 58. A tube or sleeve 67 of insulating material surrounds the projecting portion 66 and is supported in position above the discharge opening 58 preferably by means of a ring 68 and supporting brackets 69, although it may be suitably secured to the electrode 62. The purpose of the projecting portion 66 and the insulating tube 67 will be hereinafter set forth.

The valves 22, 23, 24, 26, 27 and 28 are of like construction and each comprises a movable gate member 70, a suitable casing 71 therefor and a valve seat 72. The valves 22, 23 and 24 are further provided with set nuts 73 by means of which the closure of said valves may be adjusted as desired, said valves being normally set to allow for only partial closure in order that a slight circulation of electrolyte therethrough may be effected.

Pump 21 is shown as of the centrifugal type, but, inasmuch as it forms no part of my invention, except as it performs a necessary function in the operation of the system, any suitable device for accomplishing the same purpose may be employed.

The float valve switching devices 30, 31 and 32 are of like construction and each comprises a suitable ball float 74 secured to the free end of a lever member 75 which is pivotally supported at its opposite end in a suitable manner. A switch member 76 is associated with the lever member 75 and is adapted to coöperate with stationary contact terminals 77 in a manner which will be readily understood.

The specific construction of the float valve switching devices 30, 31 and 32, and the structural details of the valves 22, 23, 24, 26, 27 and 28, may, of course, be varied from what is herein set forth.

The construction and mode of operation of the series relay 53 is old and familiar to those skilled in the art and no description of the same is considered necessary. The relay 53 is provided, as in the usual practice, with adjusting means whereby it may be set to operate at any predetermined current. It will be evident that if the adjustment be set to such a high value that the relay is never, or rarely, actuated, the operation of the system will be entirely non-automatic, whereas, if the relay be adjusted for more moderate values, the operation of the system will depend upon its action as influenced by the current traversing its winding.

Assuming the various parts of the apparatus and the circuit connections thereof to be as shown in the diagram and the pump 21 to be operating, the electrolyte in the reservoir 20 is continuously circulated through the partially closed admission valves 22, 23 and 24, the liquid rheostats 17, 18 and 19, and the discharge valves 26, 27 and 28, although no circuit connections are established. In order to operate the driving motors, the reversing switch 40 is actuated to cause either of its movable conducting segments 41 and 42 to make coöperative engagement with its stationary contact terminals it being understood that such engagement of the conducting segment 41 with the contact terminals 43 and 44 insures a supply of energy to the control magnet windings 16 of the reversing switches 8, 13, 10 and 15, while the engagement of the conducting segment 42 with the contact terminals 44 and 45 causes the energization of the control magnet windings 16 of the reversing switches 9, 12, 11 and 14.

For illustrative purposes, let it be assumed that the conducting segment 41 is caused to engage the contact terminals 43 and 44 whereby the switches 8, 13, 10 and 15 are closed to establish the motor field connections for forward rotation of the motors. This portion of the system and its operation is old and familiar to those skilled in the art and, hence, it is not considered necessary to trace the specific circuit connections or to describe, in detail, the mode of operation, it being believed that no difficulty will be encountered in understanding the same. The conducting segment 52 of the master controller 45$^a$ is then moved directly into contact with the stationary contact terminals 45$^b$, 46 and 47, along the position-indicating line $b$, the position-indicating line $a$ being passed over for a purpose to be hereinafter set forth. A circuit is thus established from the positive terminal of the battery 56, through conductor 80, conductor 81, contact terminal 45$^b$ and conducting segment 52, where the circuit divides, one path including contact terminal 46, conductor 83, magnet winding 29 of valve 28, conductor 84, conductor 85 and conductor 86 to the negative side of the battery, and the other path including contact terminal 47, conductor 87, short circuit switch 35, conductor 88, magnet winding 25 of valve 24, conductor 89, conductor 90, switch 54 of the series relay 53 and conductor 86 to the negative terminal of the battery. Energy is thus supplied to the control magnet windings 25 and 29 of the valves 24 and 28, respectively, and valve 24 is fully opened while the valve 28 is closed. The full normal flow of the electrolyte is thereby admitted into the liquid rheostat 19 and gradually fills the same. As soon as the height of the electrolyte is such as to immerse the lower portions of the coöperating electrodes associated with the rheostat 19, the main motor circuit is established from tap 91 of the secondary winding 92 of the transformer 1, through conductor 93, electrode 62 of the rheostat 19, the body of electrolyte contained therein, the coöperating electrode comprising the plates 61, conductor 94, conductor 95, magnet winding 55 of the series relay 53 and conductor 96, where the circuit divides, one branch traversing armature 4, conductor 97, conductor 98, switch 8, conductor 99, field magnet winding 6, conductor 100, switch 13, conductor 101, conductor 102, and conductor 103 to the extremity 104 of the secondary winding 92, while the other branch traverses conductor 105, armature 5, conductor 106, conductor 107, switch 10, conductor 108, field magnet winding 7, conductor 109, switch 15, conductor 110, and conductor 103 to the extremity 104 of the transformer winding 92. It is evident, therefore, that a small voltage is applied to the driving motors whereby they are started and operated at slow speed, depending upon the amount of resistance in the motor circuit provided by the immersion of the coöperating electrodes of the liquid rheostat 19 in the electrolyte.

It should be noted that the tanks 57 and the piping of the circulating system are grounded in order to prevent accidental injuries to persons who might come into contact therewith.

As the rheostat 19 gradually becomes filled with electrolyte, resistance is eliminated from the motor circuit and gradual increases of potential are applied to the driving motors, whereby said motors are caused to accelerate in accordance with well known principles.

If the relay 53 be adjusted to such a value as to be operative for moderately excessive overload currents, the operation of the system is semi-automatic, that is, if the motor acceleration current should, for any reason, exceed the value for which the relay is adjusted, the switch member 54 thereof would be disengaged from its contact terminals 111. Thus, the energizing circuit, through the magnet winding 25 of the admission valve 24, is interrupted and said valve is allowed to assume its partially closed position, thereby cutting down the normal rate of circulation and decreasing the rate of potential increase. When the motor current falls again to such a value as to allow the series relay to recomplete the circuit through the winding 25 of the valve 24, said valve is again opened and normal operation is continued.

If for any reason whatsoever, irrespective of the amount of current which traverses the motor circuit, it is desired to reduce the acceleration of the driving motors or to hold the speed thereof substantially constant, the conducting segment 52 of the master controller 45ᵃ may be moved back into contact with the contact terminals 45ᵇ and 46, along the position-indicating line a. This position of the master controller is termed the "lap position," and, by such an action, the circuit previously established through the magnet winding 25 of the valve 24 is interrupted, thereby allowing said valve to close and cut down the normal rate of circulation of the electrolyte to its minimum value. Under these circumstances, the level of the electrolyte is maintained substantially constant, although it, of course, rises very gradually. The effect upon the operation of the motors is identical to that produced by means of the automatic operation of the series relay 53, and the normal operation of the system may be resumed by moving the conducting segment 52 into contact with its coöperating stationary contact terminals along the position-indicating line b.

When the electrolyte rises within the rheostat 19 sufficiently to completely immerse the coöperating electrodes, the float-valve switching device 32 is actuated to complete a circuit from the conductor 83, through magnet winding 36 of the short circuiting switch 35, lamp 39, conductor 112, switching device 32, and conductor 113 to conductor 84. Energy is thereby supplied to the magnet winding 36 of the short circuiting switch 35 and said switch is disengaged from its lower contact terminals 114 and makes contact with its upper contact terminals 115.

As soon as the short circuiting switch 35 is raised from its terminals 114, the energizing circuit through the magnet winding 25 of the admission valve 24, is interrupted and said valve is caused to assume its partially closed position. The coöperative engagement of the movable member of the short circuiting switch 35 with its upper contact terminals 115 completes a circuit from conductor 93, through conductor 116, short circuiting switch 35 and conductor 117 to conductor 94, thereby completely short circuiting the liquid rheostat 19 and eliminating all resistance from the motor circuit. The motors are, therefore, operated economically on the lowest voltage tap or the first "running position." In the meantime, the level of the electrolyte in the rheostat 19 will have risen to that of the overflow port 60 and the excess supply thereof is disposed of through the overflow port 60 and returned to the reservoir 20. The conducting segment 52 of the master controller 45ᵃ may now be moved into engagement with the contact terminals 48 and 49, along the position-indicating line d. In this position a circuit is established from the positive terminal of the battery 56, through conductor 80, conductor 81, contact terminal 45 and contact segment 52, where the circuit divides, one branch including contact terminal 48, conductor 118, magnet winding 29 of the valve 27, conductor 119, conductor 84, conductor 85, and conductor 86 to the negative side of the battery, while the other branch includes contact terminal 49, conductor 120, short circuit switch 34, conductor 121, magnet winding 25 of the valve 23, conductor 89, conductor 90, switch 54 of the series relay 53 and conductor 86 to the negative side of the battery.

Upon the completion of the circuits just recited, energy is supplied to magnet winding 29 of the discharge valve 27 and magnet winding 25 of the admission valve 23, the closure of the former valve being effected and the latter valve being opened to its full position.

It should be understood that, concurrently with the establishment of the circuits just traced, an interruption of the circuits through the magnet winding 36 of the short circuiting switch 35, the magnet winding 29 of the discharge valve 28, and the magnet winding 25 of the admission valve 24, is effected. Thus, the short circuiting switch 130

35 is opened, the discharge valve 28 is opened and the admission valve 24 is closed. Inasmuch as the discharge valve 28 is opened, a rapid discharge of the electrolyte from the rheostat 19 is effected.

Particular reference may now be had to Figs. 2 and 3 in order that a clear understanding may be had of the action which takes place during the interruption of the circuit by means of the discharge of the electrolyte. For instance: As the electrolyte is discharged from the rheostat 19 and its level falls slightly below that of the upper portion of the insulating tube or sleeve 67, it is evident that the small body of electrolyte contained within said tube is segregated from the rest of the electrolyte and, hence, a very high resistance is inserted into the circuit just prior to the final interruption thereof. Furthermore, this interruption takes place between the projecting portion 66 of the electrode 62 and the receding electrolyte, so that the arc formed at the instant of break is confined within the non-conducting tube 67, which prevents arcing-over from the projecting portion 66 to the tank 57. The insertion of this high resistance into the circuit at the instant of break cuts the current down to a minimum value and materially reduces the violence of the arc.

Care should be exercised in determining the rate of inflow into the liquid rheostats and the rate of discharge therefrom in order that it shall be impossible to have any two rheostats filled with electrolyte at the same time, as this would complete a local short circuit upon a portion of the transformer winding 92.

The rate of discharge of the electrolyte from any rheostat should be such that the completion of the circuit through the electrodes of the adjacent rheostat shall be effected prior to the interruption of the circuit through the rheostat in question. The operation of the system is not, however, materially affected when, in the normal operation, the electrodes of any two rheostats are slightly immersed at the same time, for the reason that a considerable amount of resistance is included within the local circuit which limits the current therein to a reasonable value.

Referring again particularly to Fig. 1, having accomplished the closure of the discharge valve 27 and the opening of the admission valve 23, it is evident that the full rate of flow of the electrolyte is established into the rheostat 18 and the level of the electrolyte therein is gradually raised in contact with the coöperating electrodes. As soon as the electrolyte has risen into contact with the coöperating electrodes, a circuit is established from a tap 122 in the transformer winding 92, through conductor 123, conductor 124, electrodes 62 of rheostat 18, the body of the electrolyte contained therein, electrode comprising plates 64, conductor 125, conductor 94, conductor 95, magnet winding 55 of the series relay 53, conductor 96 and thence, in a multiple circuit, through the armatures 4 and 5 and field magnet windings 6 and 7 and conductor 103 to the extreme tap 104 of the transformer winding 92. It will be noted that a complete description of that portion of the circuit which includes the driving motors is not given for the reason that these circuits have hereinbefore been traced in detail. As the level of the electrolyte within the rheostat 18 is gradually raised, resistance is eliminated and gradual increases of potential are supplied to the driving motors which accelerate according to well known principles.

As already set forth, the rate of inflow into the rheostat 18 and, consequently, the rate of potential increase supplied to the motors, is dependent upon the action of the series relay 53, as will be readily understood. Furthermore, these rates of inflow and of potential increase may be manually retarded by moving the conducting segment 52 of the master controller 45$^a$ back into contact with contact terminal 48, along the position-indicating line $c$. In this position the energizing circuit, through the magnet winding 25 of the admission valve 23, is interrupted and said valve is closed, whereby a reduced rate of inflow and of increase of potential is effected, as already described in detail.

When the rheostat 18 is filled with electrolyte, the float valve switching device 31 is closed and a circuit is established from conductor 118, through magnet winding 36 of the short circuiting switch 34, lamp 38, conductor 126, float valve switching device 31 and conductor 127 to conductor 84. The magnet winding 36 is thereby energized and short circuiting switch 34 is disengaged from its lower contact terminals 128 and brought into coöperative engagement with its upper contact terminals 129. As soon as the short circuiting switch 34 leaves its contact terminals 128, the circuit through the magnet winding 25 of the admission valve 23 is interrupted and said valve is allowed to close. Concurrently with this operation, a circuit is completed from the conductor 123, through conductor 130, short circuiting switch 34 and conductor 131, to the conductor 94, which short circuits the rheostat 18 and eliminates all resistance from the motor circuits, this being the second economical voltage tap or "running position" of the system.

In case a great acceleration or higher speed of the driving motors is desired, the conducting segment 52 of the master controller 45$^a$ is moved into contact with the contact terminals 50 and 51, along the position-indicating line $f$, whereby the discharge valve 26 is closed and the admission valve 22 is opened to allow the electrolyte to gradually fill the liquid rheostat 17 in a manner hereinbefore described. It will also be understood that, as the conducting segment 52 is moved into contact with its contact terminals 50 and 51, the disengagement of the contact terminals 48 and 49 is effected, whereby the short circuiting switch 34 and the discharge valve 27 are opened and the admission valve 23 is closed.

As soon as the rheostat 17 is filled with the electrolyte, the float valve switching device 30 is closed, thereby energizing the magnet winding 36 of the short circuiting switch 33 and causing said switch to assume its upper position and to short circuit the rheostat 17. During this last operation, the magnet winding 25 of the admission valve 22 is deënergized and the valve 22 is closed, leaving the driving motors operating economically on the third "running position" with all of the resistance eliminated from the circuit.

I have not attempted to describe in detail the circuit connections and the mode of operation of the various switching devices in connection with the employment of the liquid rheostat 17, as they are similar to those hereinbefore set forth in connection with the operation of the liquid rheostats 19 and 18. On account of the previous detailed description and of the similarity just referred to, it is believed that those skilled in the art will experience no difficulty in understanding the same without any further exposition thereof.

The lamps 37, 38 and 39 are preferably located near the master controller and serve as signal lights to indicate to the operator upon which rheostat the motors are operating, and the condition thereof. Evidently any other suitable indicating means may be employed for this purpose.

Although I have shown and described a control system having specific circuit connections and embodying devices having more or less specific structural details, it will be understood that various modifications may be effected therein without exceeding the spirit and scope of my invention, and I desire that only such limitations shall be imposed as are indicated in the appended claims.

I claim as my invention:

1. In a control system for dynamo-electric machines, the combination with a source of energy and a plurality of dynamo-electric machines adapted to receive energy therefrom, of a plurality of individually adjustable liquid rheostats severally connected to said source of energy.

2. In a system of control for dynamo-electric machines, the combination with a source of energy, a plurality of liquid rheostats having different voltage connections to said source, and a plurality of dynamo-electric machines, of means for individually controlling the operation of said rheostats.

3. In a system of control for electric motors, the combination with a source of electrical energy, a plurality of liquid rheostats having different voltage connections to said source, and a plurality of electric motors connected in circuit with said rheostats, of means for controlling the operation of said motors by individually controlling the operation of said rheostats.

4. In a control system for dynamo-electric machines, the combination with a source of energy, a plurality of liquid rheostats having different voltage connections to said source, and a plurality of dynamo-electric machines, of means for supplying a suitable electrolyte to said rheostats, and means for controlling the supply thereof.

5. In a control system for dynamo-electric machines, the combination with a source of electrical energy, a plurality of liquid rheostats having different voltage connections to said source, and a plurality of dynamo-electric machines, of means for continuously circulating an electrolyte through said rheostats, and means for successively filling said rheostats with said electrolyte.

6. In a control system for dynamo-electric machines, the combination with a constant potential apparatus, a plurality of liquid rheostats severally connected to intermediate taps in said apparatus, and a plurality of dynamo-electric machines, of means for successively filling said rheostats with said electrolyte, and means for individually controlling the operation of said rheostats.

7. In a control system for dynamo-electric machines, the combination with a source of energy, a plurality of liquid rheostats severally connected to intermediate taps therein and a plurality of dynamo-electric machines, of means for continuously circulating an electrolyte through said rheostats.

8. In a control system for dynamo-electric machines, the combination with a constant potential apparatus, a plurality of liquid rheostats severally connected to intermediate taps in said apparatus, and a plurality of dynamo-electric machines, of a continuous circulation of an electrolyte through said rheostats, means for causing said rheostats to be filled with electrolyte at a uniform rate, and means for successively governing the operation of said rheostats.

9. In a control system for dynamo-electric machines, the combination with a constant potential apparatus, a plurality of liquid rheostats severally connected to intermediate taps in said apparatus, and a plurality of dynamo-electric machines, of a continuous circulation of an electrolyte through said rheostats, means for causing said rheostats to be filled with the electrolyte at a uniform rate and means for varying the rate of filling.

10. In a control system for dynamo-electric machines, the combination with a constant potential apparatus, a plurality of liquid rheostats severally connected to intermediate taps in said apparatus, and a plurality of dynamo-electric machines, of a circulating system for effecting a continuous flow of an electrolyte through said rheostats, and means for causing said rheostats to be successively filled with electrolyte.

11. In a control system for electric motors, the combination with a source of energy, a plurality of liquid rheostats severally connected to intermediate taps in said source, and a plurality of electric motors electrically associated therewith, of means for successively operating said rheostats to effect gradual increases of potential supplied to said motors.

12. In a system of control for electric motors, the combination with a subdivided transformer winding, a plurality of liquid rheostats severally connected to intermediate taps therein, and a plurality of electric motors, of means for successively filling said rheostats with an electrolyte whereby gradual increases of potential supplied to said motors are effected.

13. In a system of control for electric motors, the combination with a subdivided transformer winding, a plurality of liquid rheostats connected thereto, and a plurality of electric motors associated therewith, of means for successively filling said rheostats with a suitable electrolyte, and means associated with each rheostat and dependent upon the height of said electrolyte therein for short circuiting said rheostats.

14. In a control system for electric motors, the combination with a subdivided transformer winding, a plurality of liquid rheostats connected thereto, and a plurality of electric motors, of means for gradually filling said rheostats with a suitable electrolyte, and means for retarding the normal rate of filling.

15. In a control system for electric motors, the combination with a subdivided transformer winding, a plurality of liquid rheostats connected thereto, and a plurality of electric motors, of means for continuously circulating an electrolyte through said rheostats, and means dependent upon the current traversing said motors for controlling the rate of flow.

16. In a control system for electric motors, the combination with a supply circuit, a liquid rheostat connected thereto, and an electric motor adapted to receive energy therefrom, of means for continuously circulating an electrolyte through said rheostat, means for causing said electrolyte to gradually fill said rheostat, means for varying the rate of filling, and means dependent upon the height of said electrolyte in said rheostat for short circuiting said rheostat when filled.

17. In a system of control for electric motors, the combination with a constant potential apparatus, liquid rheostats severally connected to intermediate taps therein, electric motors associated therewith, and a continuously circulating electrolyte, of a controller for governing the successive individual operation of said rheostats, whereby gradual increases of potential are supplied to said motors and for controlling the rate of said increases of potential.

18. In a control system for electric motors, the combination with a plurality of liquid rheostats, a liquid-containing reservoir, means for delivering said liquid to said rheostats, and means for returning said liquid to said reservoir, of electro-responsive means for selectively controlling the operation of said rheostats and for controlling the rate of liquid circulation.

19. In a control system for electric motors, the combination with a liquid-containing reservoir, a plurality of rheostats associated therewith, and means for providing a continuous circulation of liquid therethrough, of electro-responsive means for causing said rheostats to be separately and gradually filled with said liquid, and means for disposing of excess liquid when a predetermined level is reached.

20. In a control system for electric motors, the combination with a liquid-containing reservoir, a plurality of liquid rheostats associated therewith, and means for providing a circulation of said liquid therethrough, of means associated with each rheostat for normally maintaining a slight circulation of liquid, means for increasing said flow to fill said rheostat, and means for reducing said flow when said rheostat is filled.

21. The combination with a liquid-containing reservoir, and a plurality of tanks associated therewith, each provided with an inlet port, an outlet port and an overflow port, and means for circulating said liquid, of electro-responsive means for closing said outlet port and opening said inlet port whereby said tank is gradually filled with liquid, and automatic means for partially closing said inlet port when the liquid reaches the level of said overflow port.

22. In a control system, the combination with a source of electrical energy, a containing tank, means for discharging said liquid from the bottom of said tank, and coöperating electrodes adapted to be immersed in said liquid, of means for confining the final break to a small body of liquid.

23. In a control system for dynamo electric machines, the combination with a plurality of liquid rheostats, a liquid-containing reservoir and means for continuously circulating the liquid in said reservoir, of electrically controlled means for successively directing the flow of liquid through the several rheostats.

24. In a system of control for electric motors, the combination with a derived source of energy, a plurality of liquid rheostats severally connected thereto, and a plurality of electric motors severally associated therewith, of means for circulating an electrolyte successively through said rheostats.

25. In a control system for dynamo electric machines, the combination with a derived source of energy, a plurality of liquid rheostats connected thereto, a liquid-containing reservoir and means for continuously circulating the liquid in said reservoir, of means for successively directing the flow of liquid through the several rheostats and means for preventing the filling of more than one rheostat at a time.

26. In a control system for dynamo electric machines, the combination with a derived source of energy, a plurality of liquid rheostats connected to taps therein, and means for circulating a liquid through said rheostats, of means for preventing more than one rheostat being filled at the same time.

27. In a control system for dynamo electric machines, the combination with a derived source of energy, a plurality of liquid rheostats connected to taps therein, and means for circulating a liquid through said rheostats, of means for causing the rheostats to be successively filled and means for causing the liquid in the first rheostat to be substantially discharged prior to the filling of said second rheostat to prevent a local short-circuit across said derived source.

28. In a control system for dynamo electric machines, the combination with a transformer winding having a plurality of taps, a plurality of liquid rheostats severally connected thereto and in series circuit with said dynamo-electric machines, and means for filling said rheostats successively with a body of liquid of means for preventing two rheostats from being filled at the same time.

In testimony whereof, I have hereunto subscribed my name this 22nd day of May, 1911.

NORMAN W. STORER.

Witnesses:
E. E. WISCHMEYER,
B. B. HINES.

---

Copies of this patent may be obtained for five cents each, by addressing the "Commissioner of Patents, Washington, D. C."